Figures 1, 2, 3:
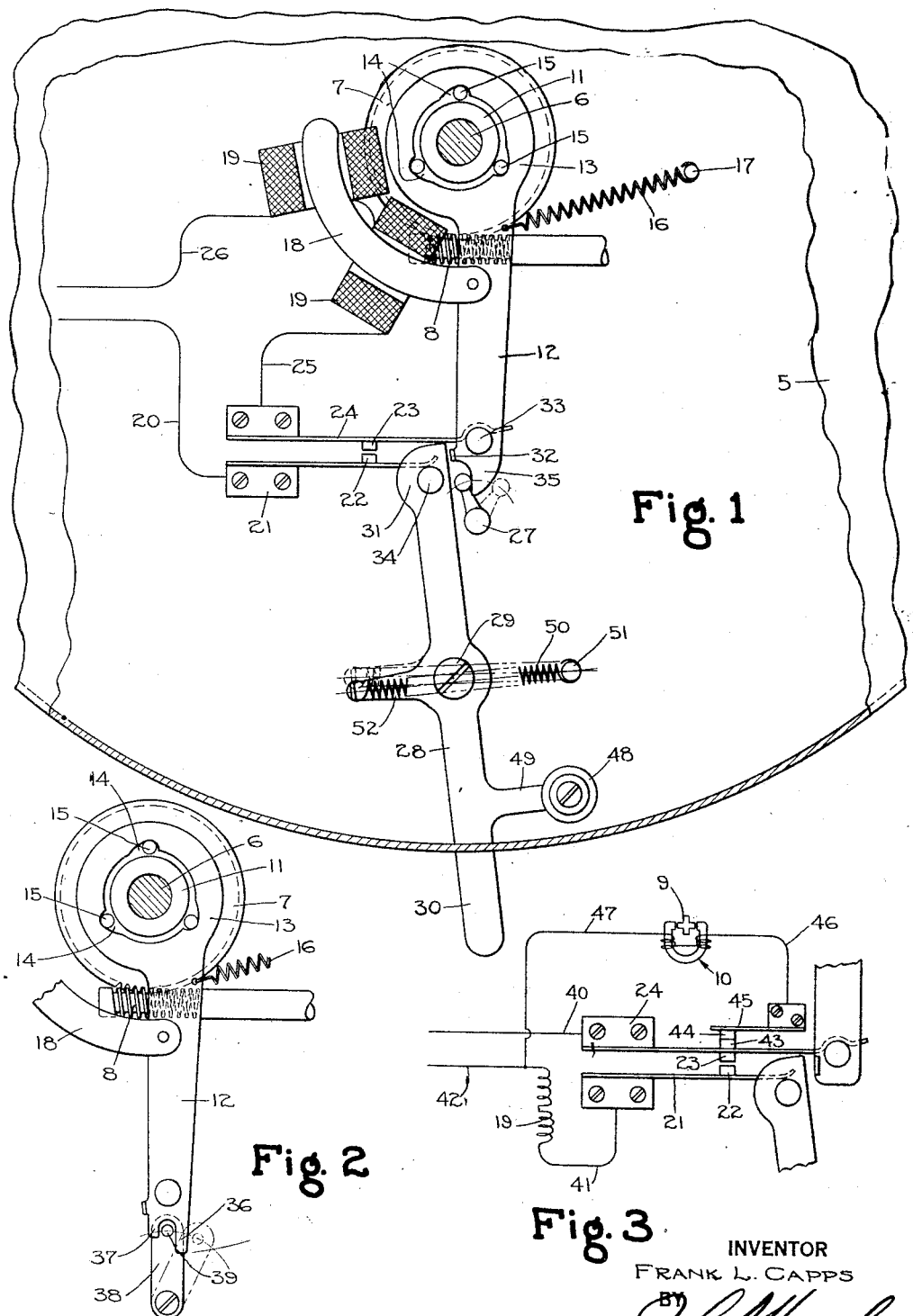

Feb. 17, 1931.   F. L. CAPPS   1,792,814
MOTOR STARTER
Filed May 10, 1928

INVENTOR
FRANK L. CAPPS
BY
Johny H Hanrahan
ATTORNEY

Patented Feb. 17, 1931

1,792,814

UNITED STATES PATENT OFFICE

FRANK L. CAPPS, OF MILFORD, CONNECTICUT, ASSIGNOR TO COLUMBIA PHONOGRAPH COMPANY, INC., OF BRIDGEPORT, CONNECTICUT, A CORPORATION OF NEW YORK

MOTOR STARTER

Application filed May 10, 1928. Serial No. 276,585.

My invention comprehends the providing of means for starting or giving an initial impulse to a synchronous motor.

The synchronous motor to which the present invention is applied comprises briefly, a horse shoe shaped electromagnet, a coil being disposed on each of the arms of the magnet and the coils being connected in series. A rotor in the form of a Greek cross is disposed between the ends of the magnet, and is provided with a shaft designated, for example, to drive the spindle supporting the turn table of a phonograph. While the shaft or spindle may obviously take other forms and be used for other purposes, in the present instance, it is shown in the form indicated.

This motor operates on alternating current and at a definite speed, whereby a turn table is driven at a definite speed as, for example, 78 revolutions per minute. When the current is supplied to the motor, if the motor is stationary when the circuit is closed, the current will not cause the motor to operate until the motor is given an initial impulse independently of the current. The initial impulse being applied, the current keeps the motor rotating. While the particular motor does not form a part of the present invention, the foregoing brief disclosure is given in order that the application of the invention may be clearly understood.

An object of the present invention is to provide an electrical means for giving an initial impulse to a synchronous motor.

A more specific object is to provide an electromagnetic means for giving initial impulse to a synchronous motor.

An additional object is to provide a means for giving an initial impulse to the motor, which means serves to automatically close the circuit to the motor, upon the initial impulse being delivered.

A still further object is to provide an electromagnetic means, employing a solenoid for giving an initial impulse to the motor spindle or shaft, and to automatically close the circuit to the motor, upon the impulse being delivered.

A more specific object of the invention is to provide a means for releasably engaging a phonograph turn table spindle, geared to the motor shaft, and means to give the first means a smart movement in one direction during which movement the first means grasps the spindle and at the end of which movement the first means releases the spindle, the first means serving to close the circuit to the motor on completion of the movement of said first means.

Yet another object is to provide in combination with means for giving an initial impulse to a synchronous motor, novel circuit making and breaking means for controlling the impulse delivering means.

A further object is to provide in combination with a synchronous motor and a phonograph turn table mounted on a spindle of electro-magnetic means disposed between the turn table and motor, for giving an initial impulse to the turn table spindle and rotor of the motor.

A further object of the invention is to provide in combination with a synchronous motor including a shaft, and a spindle having a turn table mounted thereon, means for the most part disposed beneath and concealed by the turn table, for giving an initial impulse to the turn table and spindle, only a finger piece projecting beyond the periphery of the turn table.

With the foregoing and other objects in view, the invention resides in the novel construction, novel combination, and novel arrangment of parts, as is hereafter more fully described. While satisfactory embodiments of the invention as shown and will be described in detail, it is to be understood that this description, and the annexed drawings are purely by way of illustration, and that reference must be had to the appended claims for a definition of the limitations of the invention.

In the drawings, Fig. 1 is a plan view of my starting means, showing the same applied to the spindle of the turn table, a portion of the turn table being shown;

Fig. 2 is a detailed view showing the spindle engaging portions, and showing a modified means for throwing the switch to close the circuit to the motor; and Fig. 3 is a partly diagrammatic view showing the circuit closer for closing the circuit through to the motor and solenoid, the view further diagrammatically illustrating the motor.

Referring in detail to the drawing, 5 indicates a fragment of an ordinary phonograph turn table mounted upon a spindle or shaft 6. The spindle 6 has a worm wheel keyed thereto and meshing with a worm 7 on the shaft or spindle 8 of the rotor 9 of a synchronous motor diagrammatically shown in Fig. 3, at 10. A collar or cylinder 11 may be used and is fixed upon or turned integral with the spindle 6 so that a portion of the spindle will have a relatively large diameter. Obviously, the turn table might be mounted directly on the motor spindle 8.

Disposed about the collar 11 is a clutching means comprising a lever 12 having an enlarged perforated end 13 provided with spaced recesses 14, in which are disposed rollers or balls 15. When the balls or rollers 15 occupy in the recesses 14, the positions shown in Fig. 1, the spindle 6 including the collar 11, is free to rotate independently of the lever 12. This clutching means might also be mounted to operate directly on the motor spindle or shaft.

A coil spring 16 has one of its ends connected to the lever 12 and its other end is anchored to a pin 17, which may be carried by the motor board, the device being illustrated as applied to a phonograph. The tendency of the spring 16 is to draw the lever 12 toward the right in Figs. 1 and 2.

Secured to the lever 12 is an arcuate core 18 which is shown disposed within solenoids 19. While two coils have been shown, this is merely for the purpose of convenience, since it would be quite difficult to wind a coil of sufficient length and strength in the form of an arc. It is to be understood that the number of coils employed is not material.

Current is supplied to the solenoid 19 from any suitable source through a line 20, a spring contact piece 21, a contact 22, to a contact 23, through spring contact piece 24, line 25, and line 26 which completes the circuit when the contacts 22 and 23 are in engagement. A switch 27 controls the passage of current to the motor, not shown in Fig. 1. This switch is of any preferred type and when occupying the full line position in Fig. 1, the circuit is closed and when the switch is moved to the dotted line position shown in that figure, the circuit is open.

When the parts are in the position shown in Fig. 1, the motor is running, and the turn table is being driven at a constant speed. To stop the motor, a start and stop lever 28 is rocked about its pivot 29, by gripping the finger hold end 30, and swinging this end toward the left in Fig. 1. Such action results in the enlarged end 31 of the lever engaging the upturned lug 32, of the lever 12, and swinging the lever so as to disengage the fiber pin 33 from the spring contact member 24.

As soon as this engagement is broken, the spring 16 acts to swing the arm 12 and core 18 toward the right, in Fig. 1. Further movement of the start and stop lever 28 brings about movement of the switch 27 into the dotted line position in Fig. 1, breaking the circuit to the motor, and bringing about the stoppage thereof.

As the pin 33 moves from under the element or member 24, such member drops down slightly, and when pin 34 moves from under the spring contact member 21, that member also drops down slightly so that the circuit to the solenoid will remain open. When it is desired to again start the motor, the start and stop lever 28 is swung about its pivot so that its pin 34 engages and elevates the spring contact member 21, whereby the contacts 22 and 23 are brought into engagement, and the circuit to the solenoid closed.

The coils being energized, they draw the core 18, swinging the lever 12 against the action of spring 16. During the movement of the lever under the action of the core, the rollers or balls 15 grasp the collar 11 so that the said collar 11, the spindle 6, the turn table 5 and the rotor of the motor must move with the lever 12. Thus an initial impulse is given to the motor, and when lever 12 reaches its final position its end 35 has engaged the switch 27 and moved it to close the circuit to the motor. Also, pin 33 has moved under the spring contact piece 24 elevating said piece so as to break the contact between members 22 and 23, whereby the coil 19 is de-energized, the parts being then in the relative positions shown in Fig. 1, with the motor running.

In Fig. 2 there is shown a slight modification of the means for throwing the switch to the motor. In this form of the invention, the end of lever 12 is bifurcated, whereby arms 36 and 37 are provided, the arm 36 being longer than the arm 37. The switch member 38 is provided with a pin 39 which is disposed between the arms 36 and 37, when the circuit to the motor is closed. Movement of lever 12 under the influence of spring 16 results in movement of the member 38 to the dotted line position shown in Fig. 2, in which position the short arm 37 of the lever 12 moves over the pin 39 so that the arm 12 is free to move under the influence of spring 16.

However, when the lever 12 is again moved under the influence of the core 18, its arm 36 moves on the arc indicated, engages the pin 39 of the member 38 and acts to move said member to close the circuit to the motor.

In Fig. 3 energy is supplied to the solenoid 19 through a line 40, spring contact member 24, contact 23 to contact 22, to spring contact member 21 through line 41 to the coil and through line 42 to complete the circuit. For the motor 10, the current is supplied through the line 40, member 24, a contact member 43, a contact member 44, a spring contact member 45, line 46 to the motor 10, and a line 47 completes the circuit.

In this form of the invention, the operation of switches is substantially the same as that previously described, the only difference occurs when the pin 33 of lever 12 acts to lift the spring contact 34 to close the contacts 43 and 44, whereby the motor is energized on the arm 12 reaching the limit of its movement under the action of the core 18.

Brake means are provided to stop the rotation of the turn table. To this end a brake pad 48 is carried by an arm 49 of lever 28. A spring 50 is anchored at 51 and has its other end secured to an end of an arm 52 also carried by lever 28. On movement of the lever 28 to break the circuit to the motor or close the circuit to the solenoid, the spring moves to one side or the other of pivot 29 whereby the lever is held in its new position. Also, the spring forces the break pad 48 against the downward flange of the turntable to stop the latter on the lever 25 being moved to break the circuit to the motor.

It will be obvious that the entire motor starting means here shown and described may be and is mounted under the turntable and between it and the motor. As a result of this assemblage, the parts are all concealed from view with the exception of the finger hold end 30 of lever 28. Further, the parts are readily accessible for adjustment or repair and the turn table in use will act as a fly wheel.

Having thus described the invention, what I claim is:—

1. In combination, a motor, a spindle, clutching means for engagement with said spindle, electromagnetic means for imparting movement to said clutching means whereby the spindle is given an initial turning movement, a switch for controlling the passage of current to said electromagnetic means, manually operable means for closing said switch, and automatic means for opening said switch upon said initial impulse being delivered to said spindle.

2. In combination, a motor, a spindle, clutching means for engagement with said spindle, electromagnetic means for imparting movement to said clutching means whereby the spindle is given a turning movement, a switch for controlling the passage of current to said motor, a switch for controlling the passage of current to said electromagnetic means, manually operable means for closing the circuit to said electromagnetic means said manually operable means also operable to open the switch to said motor, automatic means for opening the switch to said electromagnetic means, and said automatic means also operable to close the switch to said motor.

3. In combination, a motor, a spindle, clutching means for engagement with said spindle, electromagnetic means for imparting movement to said clutching means whereby the spindle is given a turning movement, a switch for said motor, a switch for said electromagnetic means, and manually operable means for closing the circuit to said electromagnetic means, said manually operable means also operable to open the switch to said motor.

4. In combination, a motor, a spindle, clutching means for engagement with said spindle, electromagnetic means for imparting movement to said clutching means whereby the spindle is given a turning movement, a switch for said motor, a switch for said electromagnetic means, and manually operable means movable in one direction to close the circuit to the electromagnetic means and movable in the opposite direction to open the circuit to said motor.

5. In combination, a motor, a spindle, clutching means for engagement with said spindle, electromagnetic means for imparting movement to said clutching means whereby said spindle is given a turning movement, a switch for said motor, a switch for said electromagnetic means, and a single means for opening the switch to said electromagnetic means and closing the switch to said motor.

6. In combination, a motor, a spindle, clutching means for engagement with said spindle, electromagnetic means for imparting movement to said clutching means whereby the spindle is given a turning movement, a switch for said motor, a switch for said electromagnetic means, and means for automatically and substantially simultaneously closing the switch to said motor, and opening the switch to said electromagnetic means.

Signed at New York in the county of New York, and State of New York, this 7th day of May, A. D. 1928.

FRANK L. CAPPS.